(12) United States Patent
Pritchard

(10) Patent No.: US 9,909,626 B2
(45) Date of Patent: Mar. 6, 2018

(54) DISCONNECT CLUTCH WITH POSITIVE PLATE SEPARATION

(71) Applicant: BorgWarner Inc., Auburn Hills, MI (US)

(72) Inventor: Larry A. Pritchard, Macomb, MI (US)

(73) Assignee: BorgWarner Inc., Auburn Hills, MI (US)

( * ) Notice: Subject to any disclaimer, the term of this patent is extended or adjusted under 35 U.S.C. 154(b) by 286 days.

(21) Appl. No.: 14/799,973

(22) Filed: Jul. 15, 2015

(65) Prior Publication Data

US 2016/0025156 A1    Jan. 28, 2016

Related U.S. Application Data

(60) Provisional application No. 62/027,422, filed on Jul. 22, 2014.

(51) Int. Cl.
| F16D 13/69 | (2006.01) |
| F16D 13/52 | (2006.01) |
| F16D 25/0638 | (2006.01) |
| F16D 48/02 | (2006.01) |
| F16D 13/64 | (2006.01) |

(52) U.S. Cl.
CPC ............. *F16D 13/69* (2013.01); *F16D 13/52* (2013.01); *F16D 13/648* (2013.01); *F16D 25/0638* (2013.01); *F16D 48/02* (2013.01); *F16D 2048/0212* (2013.01)

(58) Field of Classification Search
None
See application file for complete search history.

*Primary Examiner* — Jacob S Scott
(74) *Attorney, Agent, or Firm* — Young Basile Hanlon & MacFarlane, P.C.

(57) ABSTRACT

A clutch assembly (10) and a method of assembly operable for transferring rotary power between a first shaft (12) and a second shaft (14) through a set of inner clutch plates (16) and a set of outer clutch plates (18) can include at least one of an outer plate separator (28) and an inner plate separator (30). The outer plate separator (28) can be biased radially inward toward the outer clutch plates (18) for axially separating each of the outer clutch plates (18) and moveable radially outward away from the outer clutch plates (18) by centrifugal force when the clutch assembly (10) is rotated above a predetermined rotational speed threshold. The inner plate separator (30) is biased radially outward for axially separating each of the inner clutch plates (16) and moveable radially inward away from the inner clutch plates (16) by axial movement of a hydraulically actuated wedge member (31) when the clutch assembly (10) is engaged.

15 Claims, 3 Drawing Sheets

DISCONNECT CLUTCH WITH POSITIVE PLATE SEPARATION

FIELD OF THE INVENTION

The invention relates to friction devices, such as clutch assemblies for use in transmissions and, more particularly, to multi-disk clutch assemblies having low-drag characteristics.

BACKGROUND

Multi-disk friction devices are employed in clutch and brake assemblies associated with transmissions located in a vehicle powertrain. A clutch can include a first set of plates corresponding to a driving input member and a second set of plates corresponding to a driven output member. A set of friction disks or surfaces can be supported by one or both of the first and second sets of plates to be positioned interleaved between the first and second sets of plates. The clutch can be a wet multi-plate clutch, where the plates and the disks can be lubricated for rotating with respect to one another without contact. A piston can be used to cause the first and second sets of plates to come into contact with one another thereby engaging the supported friction disk surfaces for rotary transmission of torque and speed through the driving input member to the driven output member. In a vehicle having a primary driveline for driving a first set of wheels and a secondary driveline for driving a second set of wheels, a multi-disk clutch can be operated for connecting and disconnecting the secondary driveline. When the friction disk surfaces are not engaged, the input and output members can have different rotational speeds with respect to one another. When the clutch is disengaged, relative contact between the plates and the friction disk surfaces can create drag which reduces the efficiency of the power transmission between the driving input member and the driven output member. It can be desirable to separate the plates and the friction disk surfaces when the clutch is disengaged. Clutches implementing separation devices have been disclosed in U.S. Pat. No. 8,408,375; U.S. Pat. No. 8,056,694; U.S. Pat. No. 6,886,674; U.S. Pat. No. 6,543,596; U.S. Pat. No. 6,026,944; U.S. Pat. No. 5,697,473; and U.S. Pat. No. 5,226,516.

SUMMARY

To overcome the limitation of current technology, the clutch assembly can include a separation mechanism for axially separating the outer set of clutch plates with respect to one another and another separation mechanism for axially separating the inner set of clutch plates with respect to one another. The separation mechanisms can be normally biased toward plate separating positions for minimizing the amount of drag torque when the clutch assembly is disengaged.

A clutch can be rotatable about a primary axis for transferring rotary power from an input shaft to an output shaft. The clutch assembly can include a housing having an outer hub associated with one of the input and output shafts and a splined inner hub associated with the other of the input and output shafts. The clutch assembly can include a set of inner clutch plates supported by the splined inner hub and a set of outer clutch plates supported by the outer hub. The clutch assembly can include at least one of an outer plate separator biased radially inward toward the outer clutch plates for axially separating or spacing each of the outer clutch plates with respect to one another and an inner plate separator biased radially outward toward the inner clutch plates for axially separating or spacing each of the inner clutch plates with respect to one another. The outer plate separator can be moveable radially outward away from the outer clutch plates by centrifugal force, when the centrifugal force exceeds a spring biasing force as the clutch assembly is rotated above a threshold speed. The inner plate separator can be moveable radially inward away from the inner clutch plates by axial movement of a moveable wedge member, where the wedge member overcomes a spring biasing force when the clutch assembly is engaged.

A method of assembling a clutch can include positioning at least one outer plate separator for axially separating or spacing each of the outer clutch plates with respect to one another and biasing the at least one outer plate separator radially inward toward the outer clutch plates to an outer plate separating position. The outer plate separator can be moveable radially outward away from the outer clutch plates by centrifugal force to an outer plate release position, when the clutch assembly is rotated above a threshold speed independent of whether the clutch is in the engaged position or disengaged position. The method can include positioning at least one inner plate separator for axially separating or spacing each of the inner clutch plates with respect to one another and biasing at least one inner plate separator radially outward toward the inner clutch plates. The inner plate separator can move radially inward away from the inner clutch plates by axial movement of a hydraulically actuated wedge member when the clutch assembly is engaged. The method can further include positioning a hydraulically actuatable clutch apply plate adjacent the inner and outer clutch plates to be axially moveable for engaging and disengaging the inner and outer clutch plates with respect to one another and for axially moving the wedge member between an inner plate separating position and an inner plate release position.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
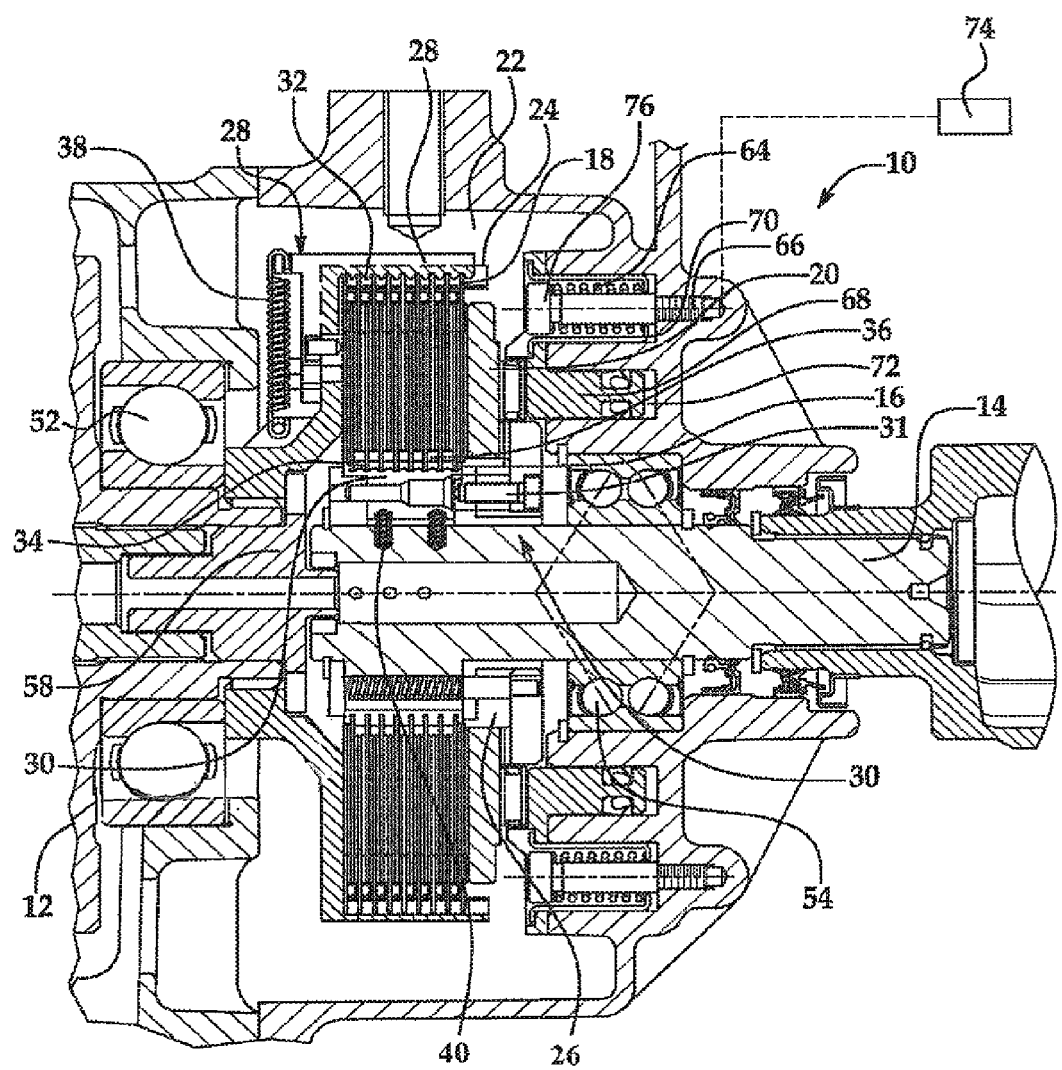
FIG. 1 is a sectional view of a clutch assembly according to the present invention.
Figure 2:
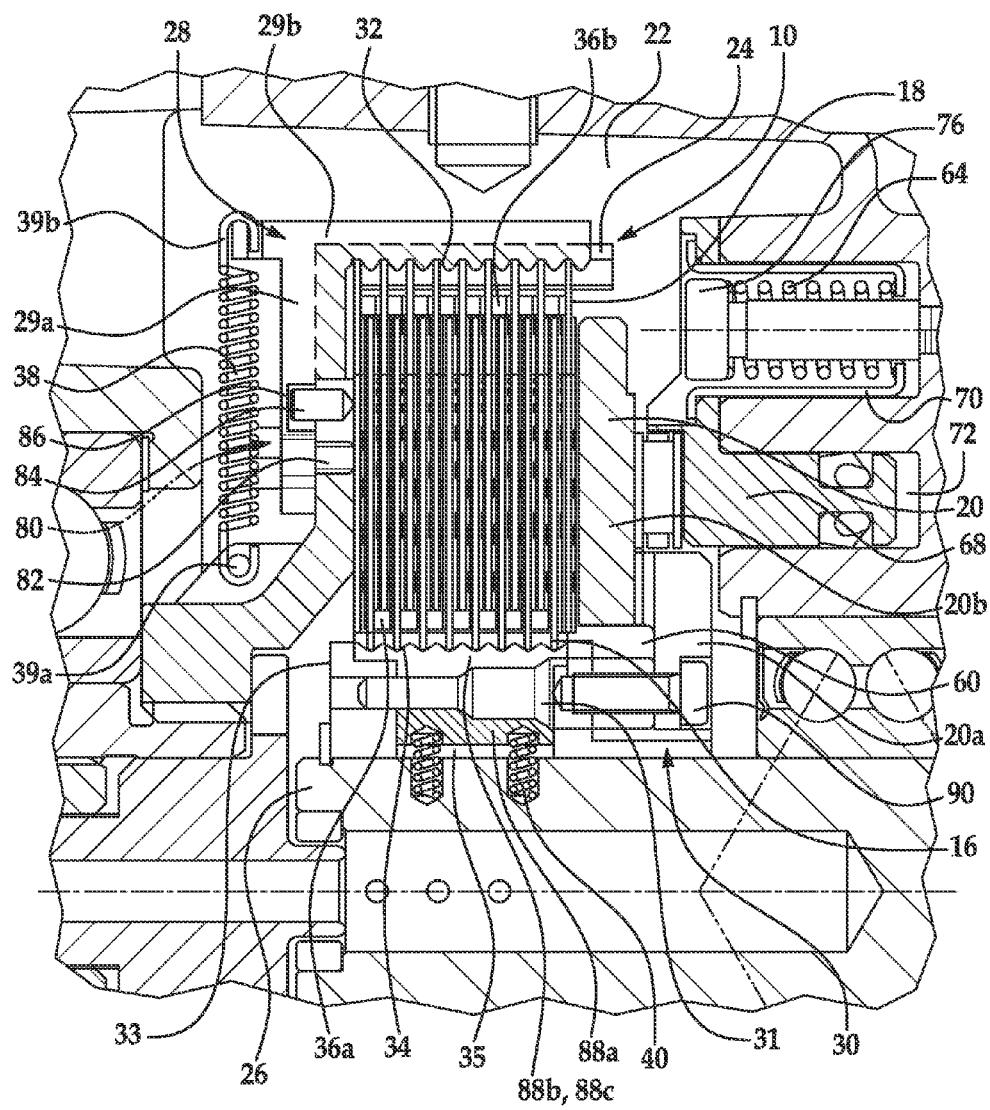
FIG. 2 is a detailed sectional view of the clutch assembly of FIG. 1 showing the outer plate separator and the inner plate separator.
Figure 3:
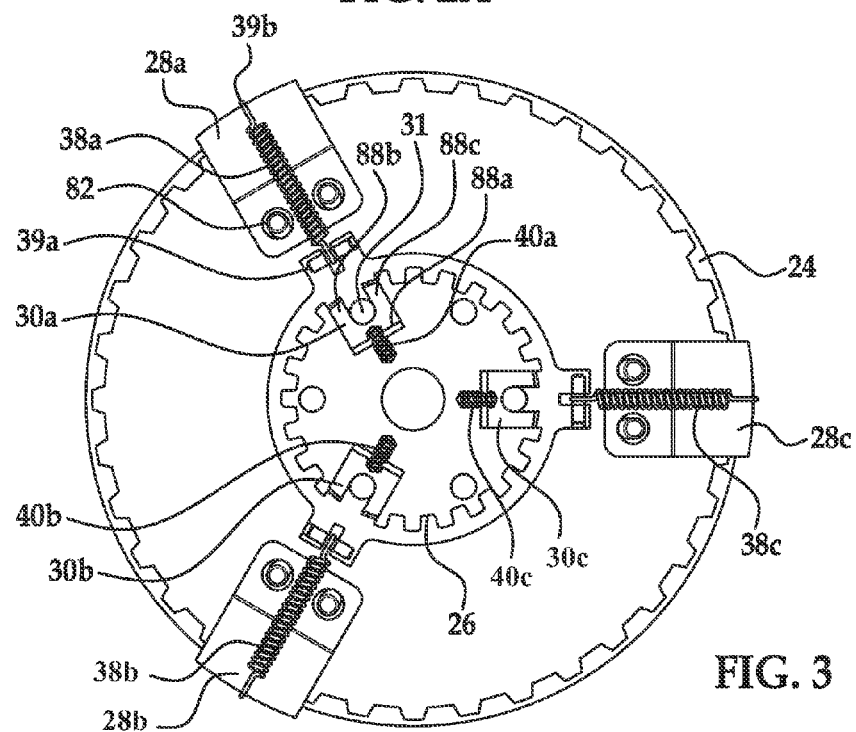
FIG. 3 is a front view of the clutch assembly showing a plurality of outer plate separators and a plurality of inner plate separators.

Referring now to FIGS. 1-3, a clutch assembly 10 for use in a vehicle having an internal combustion engine is shown. The clutch assembly 10 can include a wet multi-plate clutch. By way of example and not limitation, the clutch assembly 10 can be located in a transfer case of the internal combustion engine. The clutch assembly 10 disclosed can be used with a disconnectable power take-off unit clutch allowing operation of the vehicle between a two-wheel drive mode and an all-wheel drive mode. The clutch assembly 10 can be used in a vehicle having multiple clutches corresponding to a pair of driveshafts for driving a pair of secondary wheels in lieu of a geared differential between the pair of secondary wheels. The clutch assembly 10 can transfer rotary power from an input shaft 12 connected to the engine or a power source and an output shaft 14. As illustrated in FIG. 1, the input shaft 12 can be carried in the transfer case via bearings 52. The output shaft 14 can be rotatable relative to and coaxial with the input shaft 12 via additional bearings 54. The clutch assembly 10 can be rotatable about a primary axis and can have a housing 22 including an outer hub 24 and a splined inner hub 26. The outer hub 24 can include a first end opened towards the output shaft 14. The splined inner hub 26 can be concentrically disposed within the outer hub 24 and can be spline-coupled to the input shaft 12 and the outer hub 24 can be coupled to the output shaft 14. Axial movement of the outer hub 24 and the splined inner hub 26 can be limited by a retaining ring 58. A plurality of inner clutch plates 16, or friction plates having friction linings bonded to opposite surfaces thereof, can be axially slidably spline-fitted to the splined inner hub 26. The plurality of outer clutch plates 18 can be provided with each outer clutch plate 18 interposed between corresponding inner clutch plates 16. The outer clutch plates 18 can be supported by the outer hub 24. The inner and outer sets of clutch plates 16, 18 can be disposed to be interleaved with respect to one another, such that each outer clutch plate 18 is positioned between two inner clutch plates 16, and each inner clutch plate 16 is positioned between two outer clutch plates 18, with the exception for the two outermost end clutch plates. The inner set of clutch plates 16 can be disposed radially inward and the outer set of clutch plates 18 can be disposed radially outward. As illustrated in FIGS. 1-2, the clutch assembly 10 can include a clutch apply plate 20 located adjacent the inner and outer clutch plates 16, 18 and can be mounted on an outer peripheral wall 60 of the splined inner hub 26. The clutch apply plate 20 can be operable for axial movement for engaging and disengaging the clutch assembly 10. When the clutch assembly 10 is disengaged, the clutch apply plate 20 can be normally biased axially away from the inner and outer clutch plates 16, 18 by a biasing spring 64 acting on an axial extending flange 70 coupled for axial movement with a piston 68. The biasing spring 64 can be mounted to the housing 22 via a mounting bracket 76. The piston 68 can axially move against the clutch apply plate 20 to engage the clutch assembly 10. The piston 68 can be driven in axial movement through a corresponding fluid chamber 72. A hydraulic actuator 66 can be in fluid communication with the fluid chamber 72 for pressurizing the fluid chamber 72 and axially moving the piston 68.

As illustrated in FIG. 1, the vehicle can include an engine control unit (ECU) 74 such that when an electronic signal is provided to the ECU 74 for actuating the clutch assembly 10, the ECU 74 can transmit the signals for operation of the hydraulic actuator 66. When it is desired to automatically or manually engage the clutch assembly 10, the hydraulic actuator 66 can be actuated and can pressurize fluid toward the fluid chamber 72. The fluid pressure supplied can exceed the biasing force of the biasing spring 64 acting on the axial extending flange 70, such that the piston 68 can move the axial extending flange 70 axially toward the inner and outer clutch plates 16, 18. The piston 68 can axially press the clutch apply plate 20 against the inner and outer clutch plates 16, 18 for frictionally coupling the plates for rotation and allowing the clutch assembly 10 to transfer rotary power between the input and output shaft 12, 14. The clutch apply plate 20 can be mounted for rotation with the inner and outer clutch plates 16, 18 about the primary axis. Axial movement toward the inner and outer clutch plates 16, 18 of the axial extending flange 70 can be limited by the housing 22, such that the piston 68 and the clutch apply plate 20 can hold the inner and outer clutch plates 16, 18 in frictional torque transmitting engagement during axial movement. When the clutch assembly 10 is to be disengaged, fluid pressure is released from the fluid chamber 72 by the hydraulic actuator 66 and the biasing force of the biasing spring 64 can drive the axial extending flange 70 and the piston 68 in the fluid chamber 72 axially away from the inner and outer clutch plates 16, 18 for releasing the frictional engagement between the inner and outer clutch plates 16, 18.

When the piston 68 is biased axially away from acting on the clutch apply plate 20 and engaging the inner and outer clutch plates 16, 18, the clutch assembly 10 can include at least one of an outer plate separator 28 for axially separating the outer clutch plates 18 and an inner plate separator 30 for axially separating the inner clutch plates 16. The outer plate separator 28 can be normally biased radially inward toward the outer clutch plates 18 by at least one first biasing member 38. The outer plate separator 28 can be L-shaped having a radially extending segment 29a and an axially extending segment 29b extending perpendicular with respect to one another. The axially extending segment 29b can be supported by the outer hub 24 and include a plurality of teeth 32. When the clutch assembly 10 is disengaged and the outer plate separator 28 is normally biased radially inward, each of the plurality of teeth 32 can axially engage the outer clutch plates 18 to separate each of the outer clutch plates 18 toward predefined positions spaced axially from one another. The first biasing member 38, which can include a torsion spring having a first end 39a fixed to the outer hub 24 and a second end 39b fixed to an end of the axially extending segment 29b and extending radially, parallel to the radially extending segment 29a. The outer plate separator 28 can include a bracket 80 fastened to the outer hub 24 by a fastener 82 defining a passage for guiding reciprocal movement of the outer plate separator 28 radially between a radially inward outer plate separating position and a radially outward outer plate non-separating position. The bracket 80 supporting the outer plate separator 28 can include more than one fastener 82. The bracket 80 can define an aperture for receiving the radially extending segment 29a. The radially extending segment 29a can be adjacent the outer hub 24 and can define an aperture 86 for receiving an axial pin 84 supported by the outer hub 24. The axial pin 84 can be supported to extend axially outwardly from the outer hub 24. The radially extending segment 29a can be limited in radial movement within the bracket 80 by the aperture 86 engaging with the fixed axial pin 84 as a stop at outer ends of the aperture 86. When the clutch assembly 10 is stationary and non-rotating, the outer plate separator 28 can be biased for axially separating the outer clutch plates 18 with respect to one another. When the clutch assembly 10 is rotating during engagement or disengagement, the centrifugal force of the clutch assembly 10 can exceed the biasing force of the first biasing member 38. The first biasing member 38 can radially extend outward from an anchor location on the outer hub 24, such that the radially extending segment 29a and the axially extending segment 29b can move radially outward from the outer clutch plates 18, limited in radial travel by the radial movement of the aperture 86 with respect to the fixed axial pin 84. The plurality of teeth 32 can move radially outward from the outer clutch plates 18 allowing the inner and outer clutch plates 16, 18 to engage for rotation. The outer plate separator 28 can remain in the radially outward position while the clutch assembly 10 is rotating as long as the centrifugal force from rotation exceeds the biasing force of the first biasing member 38.

When the clutch assembly 10 is disengaged, and the clutch apply plate 20 is not axially pressing against the inner and outer clutch plates 16, 18, the inner plate separator 30 can axially separate the inner clutch plates 16 with respect to one another. The inner plate separator 30 can be a U-shaped body and have an axially extending segment 88a and a first and second radially extending segment 88b, 88c extending radially outwardly away from the axially extending segment 88a towards the inner clutch plates 16. The axially extending segment 88a can be supported by a second biasing member 40 interposed between the splined inner hub 26 and the axially extending segment 88a. The second biasing member 40 can normally bias the inner plate separator 30 radially outward toward the inner clutch plates 16. The second biasing member 40 can include a first end 41a fixed within an aperture 43a defined by the splined inner hub 26 and a second end 41b fixed within an aperture 43b defined by the axially extending segment 88a such that a gap 35 exists between the axially extending segment 88a and the splined inner hub 26 allowing radial reciprocal movement of the inner plate separator 30 between a radially outward inner plate separating position and a radially inward inner plate non-separating position. The first and second radially extending segment 88b, 88c can extend generally perpendicular, radially outward with respect to the axially extending segment 88a and can define a recess for receiving a wedge member 3 1 between the first and second radially extending segment 88b, 88c. Each of the first and second radially extending segment 88b, 88c can include a plurality of teeth 34. The plurality of teeth 34 can axially separate each of the inner clutch plates 16 with respect to one another when the clutch assembly 10 is disengaged and the biasing force of the second biasing member 40 biases the inner plate separator 30 radially outward. By way of example and not limitation, the inner plate separator 30 can receive the wedge member 31 traversing at least a portion of the axially extending segment 88a and extending circumferentially between the radially extending segments 88b, 88c.

Figure 2A:
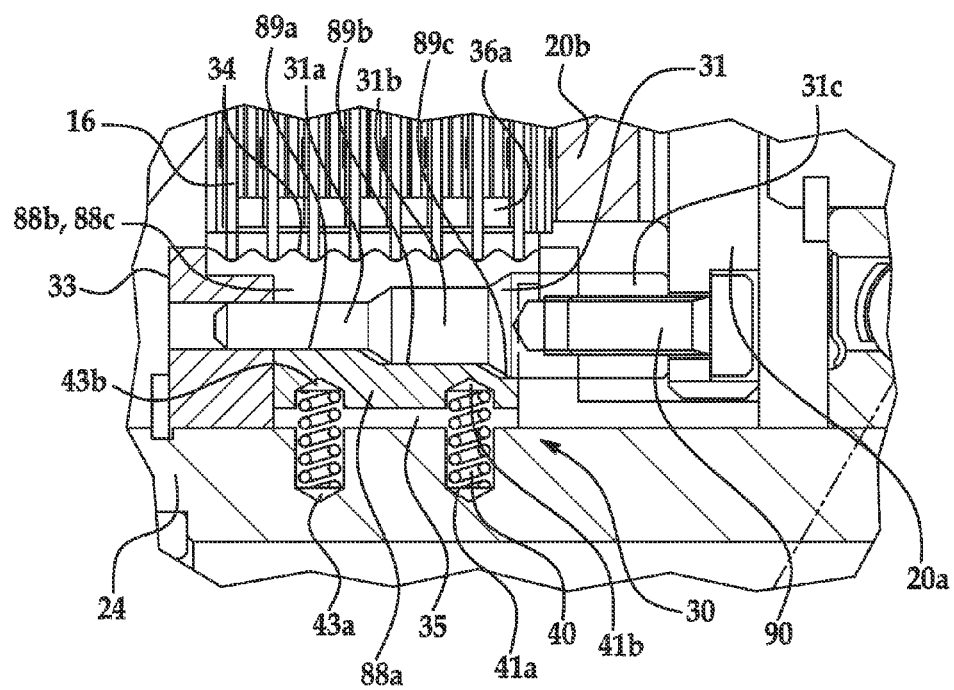
FIG. 2A is a detailed sectional view of FIG. 2 showing the inner plate separator in greater detail.

As best illustrated in FIGS. 2-2A, the axially extending segment 88a can include a plurality of elevated surfaces 89a, 89b, 89c engageable by the wedge member 31. The plurality of elevated surfaces 89a, 89b, 89c can have variable distances with respect to the splined inner hub 26, the distances increasing in radial distance as a distance axially away from the clutch apply plate 20 increases. The wedge member 31 can include a plurality of cylindrical portions 31a, 31b, 31 c increasing in diameter as a distance axially towards the clutch apply plate 20 decreases. A conical surface is defined between each of the adjacent cylindrical portions 31a, 31b, 31c providing an angled wedge acting surface for engagement with angled surfaces formed on the inner plate separator 30 between adjacent elevated surfaces 89a, 89b, 89c, as best seen in FIG. 2. The outer plate separator 28 and inner plate separator 30 can be formed to complementarily engage the arcuate peripheral segments of the inner clutch plates 16 and outer clutch plates 18, as best seen in FIG. 3. By way of example and not limitation, when the clutch assembly 10 is disengaged, the distal end of the wedge member 31 can have the first cylindrical portion 31a having the smallest diameter engage the elevated surface 89a having the largest radial distance; the second cylindrical portion 31b having a larger or intermediate diameter with respect to the first cylindrical portion 31a can engage the elevated surface 89b having a smaller or intermediate radial distance with respect to the elevated surface 89a; and a proximal end of a wedge member 21 can have the third cylindrical portion 31c having a larger diameter with respect to the second cylindrical portion 31b engage the elevated surface 89c having a smaller radial distance with respect to the elevated surface 89b. The clutch apply plate 20 can include an outer apply plate hub 20a and an inner apply plate hub 20b coupled to the outer apply plate hub 20a. The inner apply plate hub 20b can engage the inner and outer clutch plates 16, 18 and be axially driven by the piston 68 when the clutch assembly 10 is engaged. The outer apply plate hub 20a can include an aperture for receiving a bolt 90. The bolt 90 can extend through the outer apply plate hub 20a and third cylindrical portion 31c of the wedge member 31 connecting the clutch apply plate 20 and the wedge member 31 for axial movement.

When it is desirable to manually or automatically engage the clutch assembly 10, the inner apply plate hub 20b of the clutch apply plate 20 can be driven axially towards the inner and outer clutch plates 16, 18 to engage the clutch assembly 10 as previously disclosed. When the clutch apply plate 20 is axially driven by the piston 68, the outer apply plate hub 20a axially moves the wedge member 31 through the inner plate separator 30. The inner plate separator 30 can include an end 33 for limiting axial movement of the wedge member 31. When the outer apply plate hub 20a axially moves the wedge member 31, the first cylindrical portion 31a can axially traverse the elevated surface 89a such that the second cylindrical portion 31b can engage an edge of the elevated surface 89a and the third cylindrical portion 31c can engage an edge of the elevated surface 89b. The force applied against the axially extending segment 88a can exceed the biasing force of the second biasing member 40 such that the second biasing member 40 can be compressed and the inner plate separator 30 can be driven radially inward away from the inner clutch plates 16. The inner plate separator 30 can radially move to close the gap 35 defined between the splined inner hub 26 and the axially extending segment 88a. When the inner plate separator 30 is driven radially inward away from the inner clutch plates 16, the plurality of teeth 34 located on the radially extending segments 88b, 88c can radially move away from separating the inner clutch plates 16 and the inner and outer clutch plates 16, 18 can engage for rotation.

As illustrated in FIGS. 1-2, the clutch assembly 10 can further include a plurality of wave springs 36 interposed between adjacent inner and outer clutch plates 16, 18. As best illustrated in FIG. 2, the clutch assembly 10 can include a first set of wave springs 36a for separating the inner clutch plates 16 with respect to one another and a second set of wave springs 36b for separating the outer clutch plates 18 with respect to one another. The first set of wave springs 36a can be located radially outward with respect to the inner plate separator 30 and fixed between each of the inner clutch plates 16 to prevent radial movement of the wave springs 36a. The second set of wave springs 36b can be located radially inward with respect to the outer plate separator 28 and fixed between each of the outer clutch plates 18 to prevent radial movement of the wave springs 36b. The wave springs 36 can bias the corresponding inner and outer clutch plates 16, 18 toward separated spaced apart positions when the clutch assembly 10 is disengaged and can be compressed by axial movement of the clutch apply plate 20 against the inner and outer clutch plates 16, 18 when the clutch assembly is engaged allowing the inner and outer clutch plates 16, 18 to engage for rotation.

As illustrated in FIG. 3, the clutch assembly 10 can include a plurality of outer plate separators 28a, 28b, 28c, a plurality of inner plate separators 30a, 30b, 30c, a plurality of first biasing members 38a, 38b, 38c, and a plurality of second biasing members 40a, 40b, 40c. By way of example and not limitation, the clutch assembly 10 can include three outer plate separators 28a, 28b, 28c disposed uniformly about the outer hub 24 at 1 80° with respect to one another. Each of the plurality of outer plate separators 28a, 28b, 28c can be normally biased by a corresponding one of the plurality of first biasing members 38a, 38b, 38c radially inward and can be operable for uniform radial movement with respect to the set of outer clutch plates 18. It is contemplated that each of the plurality of outer plate separators 28a, 28b, 28c can incorporate the above description of the at least one outer plate separator 28. By way of example and limitation, the clutch assembly 10 can include three inner plate separators 30a, 30b, 30c disposed uniformly about the splined inner hub 26 at 120° with respect to one another. Each of the plurality of inner plate separators 30a, 30b, 30c can be normally biased by a corresponding one of the plurality of second biasing members 40a, 40b, 40c radially outward and can be operable for uniform radial movement with respect to the set of inner clutch plates 16. It is contemplated that each of the plurality of inner plate separators 30a, 30b, 30c can incorporate the above description of the at least one inner plate separator 30. The plurality of outer plate separators 28a, 28b, 28c and the plurality of inner plate separators 30a, 30b, 30c can axially separate each of the corresponding inner and outer clutch plates 16, 18 when the clutch assembly is disengaged and non-rotating.

The plurality of outer plate separators 28a, 28b, 28c can move radially outward toward an outer plate non-separating position of the outer clutch plates 18 when the clutch assembly 10 is rotating, during both engagement and disengagement of the clutch. In other words, the outer plate separators 28a, 28b, 28c are operable in response to being driven in rotation (i.e. generating centrifugal force) above a predetermined threshold rotational speed independent of the operable position of the clutch being in the engaged position or the disengaged position. The outer plate separators 28a, 28b, 28c can move radially inward toward an outer plate separating position of the outer clutch plates 18 when the clutch assembly 10 is stationary or rotating below the predetermined threshold rotational speed independent of the operable position of the clutch being in the engaged position or the disengaged position.

The plurality of inner plate separators 30a, 30b, 30c can move radially outward toward an inner plate separated position of the inner clutch plates 16 when the clutch is in the disengaged position where the apply plate 20 is prevented from acting against the inner and outer clutch plates 16, 18. The plurality of inner plate separators 30a, 30b, 30c can move radially inward toward an inner plate non-separating position of the inner clutch plates 16 when the clutch is engaged where the apply plate 20 is acting against the inner and outer clutch plates 16, 18.

It should be recognized that the outer plate separator 28 and inner plate separator 30 can be used independently of one another in a clutch assembly or can be used in combination with one another without departing from the present disclosure.

A method of assembling a clutch assembly 10 can be used for assembling the clutch assembly 10 having a splined inner hub 26 associated with a first shaft 12 and an outer hub 24 associated with a second shaft 14. By way of example and not limitation, the first shaft 12 can be an input shaft and the second shaft 14 can be an output shaft. The clutch assembly 10 can be operable for transferring rotary power from the input shaft 12 to the output shaft 14 through a set of inner clutch plates 16 supported by the splined inner hub 26 and a set of outer clutch plates 18 supported by the outer hub 24. The method can include positioning at least one of an outer plate separator 28, 28a, 28b, 28c for axially separating each of the outer clutch plates 18 and an inner plate separator 30, 30a, 30b, 30c for axially separating each of the inner clutch plates 16. The method can include biasing the at least one outer plate separator 28, 28a, 28b, 28c radially inward toward the outer clutch plates 18. The outer plate separator 28, 28a, 28b, 28c can be moveable radially outward away from the outer clutch plates 18 by centrifugal force when the clutch assembly 10 is rotating above a predetermined rotational speed when the clutch assembly is in the engaged position or the disengaged position, i.e., completely independent of the clutch assembly position. The method can include biasing at least one inner plate separator 30, 30a, 30b, 30c radially outward toward the inner clutch plates 16. The inner plate separator 30, 30a, 30b, 30c can move radially inward away from the inner clutch plates 16 by axial movement of a hydraulically actuated wedge member 31 when the clutch assembly 10 is engaged. The method can further include positioning a hydraulically actuatable clutch apply plate 20 adjacent the inner and outer clutch plates 16, 18 to be axially moveable for engaging and disengaging the inner and outer clutch plates 16, 18 and axially moving the wedge member 31.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a clutch assembly (10) rotatable about a primary axis and having a splined inner hub (26) associated with a first shaft (12) and an outer hub (24) associated with a second shaft (14), the clutch assembly (10) operable for transferring rotary power between the first shaft (12) and the second shaft (14) through a set of inner clutch plates (16) supported by the splined inner hub (26) and a set of outer clutch plates (18) supported by the outer hub (24), comprising:
at least one of:
at least one outer plate separator (28, 28a, 28b, 28c) biased radially inward toward the outer clutch plates (18) for axially separating each of the outer clutch plates (18) and moveable radially outward away from the outer clutch plates by centrifugal force exceeding the biasing force when the clutch assembly (10) is rotating above a predetermined rotational speed threshold; and
at least one inner plate separator (30, 30a, 30b, 30c) biased radially outward toward the inner clutch plates (16) for axially separating each of the inner clutch plates (16) and moveable radially inward away from the inner clutch plates (16) by axial movement of a hydraulically actuated wedge member (31) exceeding the biasing force when the clutch assembly (10) is engaged.

2. The clutch assembly of claim 1, wherein the at least one outer plate separator (28) further comprises:
at least one first biasing member (38, 38*a*, 38*b*, 38*c*) normally biasing the at least one outer plate separator (28, 28*a*, 28*b*, 28*c*) radially inward.

3. The clutch assembly of claim 2, wherein the at least one outer plate separator (28, 28*a*, 28*b*, 28*c*) further comprises:
a radially extending segment (29*a*) adjacent the outer hub (24); and
an axially extending segment (29*b*) perpendicular the radially extending segment (29*a*) and supported by the outer hub (24), the axially extending segment (29*b*) having a plurality of teeth (32) for axially separating each of the outer clutch plates (18).

4. The clutch assembly of claim 3, wherein the clutch assembly (10) includes a plurality of outer plate separators (28*a*, 28*b*, 28*c*) disposed uniformly about the outer hub (24) and a plurality of first biasing members (38*a*, 38*b*, 38*c*), each of the plurality of outer plate separators (28*a*, 28*b*, 28*c*) normally biased by a corresponding one of the plurality of first biasing members (38*a*, 38*b*, 38*c*) radially inward, the plurality of outer plate separators (28*a*, 28*b*, 28*c*) operable for uniform radial movement with respect to the set of outer clutch plates (18).

5. The clutch assembly of claim 1, wherein the at least one inner plate separator (30, 30*a*, 30*b*, 30*c*) further comprises:
at least one second biasing member (40, 40*a*, 40*b*, 40*c*) normally biasing the at least one inner plate separator (30, 30*a*, 30*b*, 30*c*) radially outward.

6. The clutch assembly of claim 5, wherein the at least one inner plate separator (30, 30*a*, 30*b*, 30*c*) further comprises:
an axially extending segment (88*a*) having a plurality of elevated surfaces (89*a*, 89*b*, 89*c*) engageable by the wedge member (31); and
a first and second radially extending segment (88*b*, 88*c*) perpendicular the axially extending segment (88*a*) and defining a recess for receiving the wedge member (31) between the first and second radially extending segment (88*b*, 88*c*), each of the first and second radially extending segment (88*b*, 88*c*) having a plurality of teeth (34) for axially separating each of the inner clutch plates (16).

7. The clutch assembly of claim 6, wherein the clutch assembly (10) includes a plurality of inner plate separators (30*a*, 30*b*, 30*c*) disposed uniformly about the splined inner hub (26) and a plurality of second biasing members (40*a*, 40*b*, 40*c*), each of the plurality of inner plate separators (30*a*, 30*b*, 30*c*) normally biased by a corresponding one of the plurality of second biasing members (40*a*, 40*b*, 40*c*) radially outward, the plurality of inner plate separators (30*a*, 30*b*, 30*c*) operable for uniform radial movement with respect to the set of inner clutch plates (16).

8. The clutch assembly of claim 1, further comprising:
a plurality of wave springs (36, 36*a*, 36*b*) interposed between the inner and outer clutch plates (16, 18) and radially fixed for separating the inner and outer clutch plates (16, 18).

9. A clutch assembly (10) rotatable about a primary axis for transferring rotary power from a first shaft (12) to a second shaft (14), comprising:
a housing (22) having an outer hub (24) associated with the second shaft (14) and a splined inner hub (26) associated with the first shaft (12);
a set of inner clutch plates (16) supported by the splined inner hub (26);
a set of outer clutch plates (18) supported by the outer hub (24);
at least one outer plate separator (28, 28*a*, 28*b*, 28*c*) biased radially inward toward the outer clutch plates (18) for axially separating each of the outer clutch plates (18) and moveable radially outward away from the outer clutch plates (18) by centrifugal force exceeding the biasing force when the clutch assembly (10) is rotating above a predetermined rotational speed threshold;
at least one inner plate separator (30, 30*a*, 30*b*, 30*c*) biased radially outward toward the inner clutch plates (16) for axially separating each of the inner clutch plates (16) and moveable radially inward away from the inner clutch plates (16) by axial movement of a wedge member (31) exceeding the biasing force when the clutch assembly (10) is engaged; and
a clutch apply plate (20) rotatable about the primary axis and hydraulically actuatable, the clutch apply plate (20) axially moveable with respect to the inner and outer clutch plates (16, 18) for engaging and disengaging the clutch assembly (10), the clutch apply plate (20) connected for axial movement with the wedge member (31).

10. The clutch assembly of claim 9 further comprising:
at least one first biasing member (38, 38*a*, 38*b*, 38*c*) normally biasing the at least one outer plate separator (28, 28*a*, 28*b*, 28*c*) radially inward; and
at least one second biasing member (40, 40*a*, 40*b*, 40*c*) normally biasing the at least one inner plate separator (30, 30*a*, 30*b*, 30*c*) radially outward.

11. The clutch assembly of claim 10, further comprising:
the at least one outer plate separator (28, 28*a*, 28*b*, 28*c*) including a radially extending segment (29*a*) adjacent the outer hub (24) and an axially extending segment (29*b*) perpendicular the radially extending segment (29*a*) and supported by the outer hub (24), the axially extending segment (29*b*) having a plurality of teeth (32) for axially separating each of the outer clutch plates (18); and
the at least one inner plate separator (30, 30*a*, 30*b*, 30*c*) including an axially extending segment (88*a*) having a plurality of elevated surfaces (89*a*, 89*b*, 89*c*) engageable by the wedge member (31) and a first and second radially extending segment (88*b*, 88*c*) perpendicular the axially extending segment (88*a*) and defining a recess for receiving the wedge member (31) between the first and second radially extending segment (88*b*, 88*c*), each of the first and second radially extending segment (88*b*, 88*c*) having a plurality of teeth (34) for axially separating each of the inner clutch plates (16).

12. The clutch assembly of claim 11, wherein the clutch assembly (10) includes the plurality of outer plate separators (28*a*, 28*b*, 28*c*) disposed uniformly about the outer hub (24), the plurality of inner plate separators (30*a*, 30*b*, 30*c*) disposed uniformly about the splined inner hub (26), a plurality of first biasing members (38*a*, 38*b*, 38*c*), and a plurality of second biasing members (40*a*, 40*b*, 40*c*), each of the plurality of outer plate separators (28*a*, 28*b*, 28*c*) normally biased by a corresponding one of the plurality of first biasing members (38*a*, 38*b*, 38*c*) radially inward, the plurality of outer plate separators (28*a*, 28*b*, 28*c*) operable for uniform radial movement with respect to the set of outer clutch plates (18), each of the plurality of inner plate separators (30*a*, 30*b*, 30*c*) normally biased by a corresponding one of the plurality of second biasing members (40*a*, 40*b*, 40*c*) radially outward, the plurality of inner plate separators (30*a*, 30*b*, 30*c*) operable for uniform radial movement with respect to the set of inner clutch plates (16).

13. The clutch assembly of claim 9, further comprising:
a plurality of wave springs (36, 36a, 36b) interposed between the inner and outer clutch plates (16, 18) and radially fixed for separating the inner and outer clutch plates (16, 18).

14. A method of assembling a clutch assembly (10) rotatable about a primary axis and having a splined inner hub (26) associated with a first shaft (12) and an outer hub (24) associated with a second shaft (14), the clutch assembly (10) operable for transferring rotary power between the first shaft (12) and the second shaft (14) through a set of inner clutch plates (16) supported by the splined inner hub (26) and a set of outer clutch plates (18) supported by the outer hub (24), the method comprising:
positioning at least one outer plate separator (28, 28a, 28b, 28c) for axially separating each of the outer clutch plates (18);
biasing the at least one outer plate separator (28, 28a, 28b, 28c) radially inward toward the outer clutch plates (18), the outer plate separator (28, 28a, 28b, 28c) moveable radially outward away from the outer clutch plates (18) by centrifugal force exceeding the biasing force when the clutch assembly (10) is rotated above a predetermined rotational speed threshold;
positioning at least one inner plate separator (30, 30a, 30b, 30c) for axially separating each of the inner clutch plates (16); and
biasing the at least one inner plate separator (30, 30a, 30b, 30c) radially outward toward the inner clutch plates (16), the inner plate separator (30, 30a, 30b, 30c) moveable radially inward away from the inner clutch plates (16) by axial movement of a hydraulically actuated wedge member (31) exceeding the biasing force when the clutch assembly (10) is engaged.

15. The method of claim 14, further comprising:
positioning a hydraulically actuatable clutch apply plate (20) adjacent the inner and outer clutch plates (16, 18), the clutch apply plate (20) rotatable about the primary axis and axially moveable for engaging and disengaging the inner and outer clutch plates (16, 18) and axially moving the wedge member (31).

* * * * *